Figure 9:
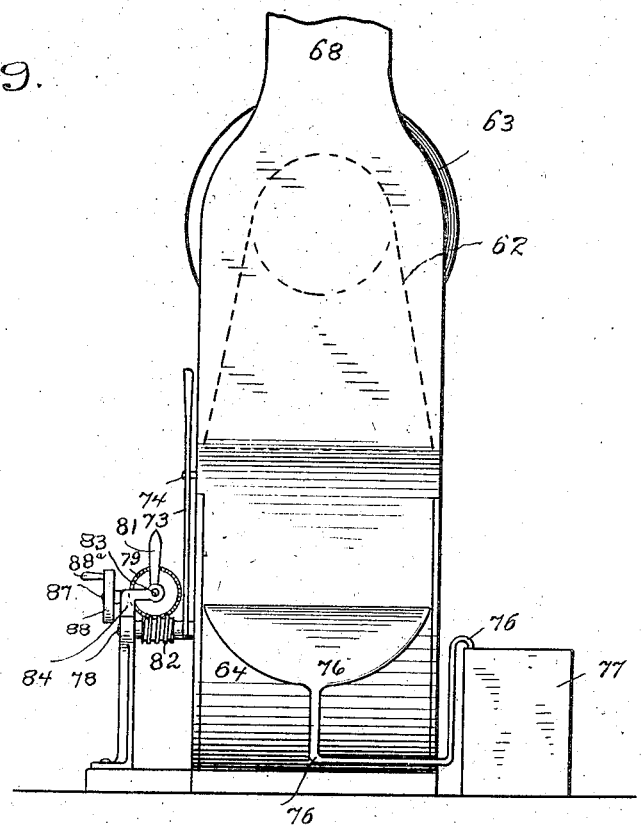

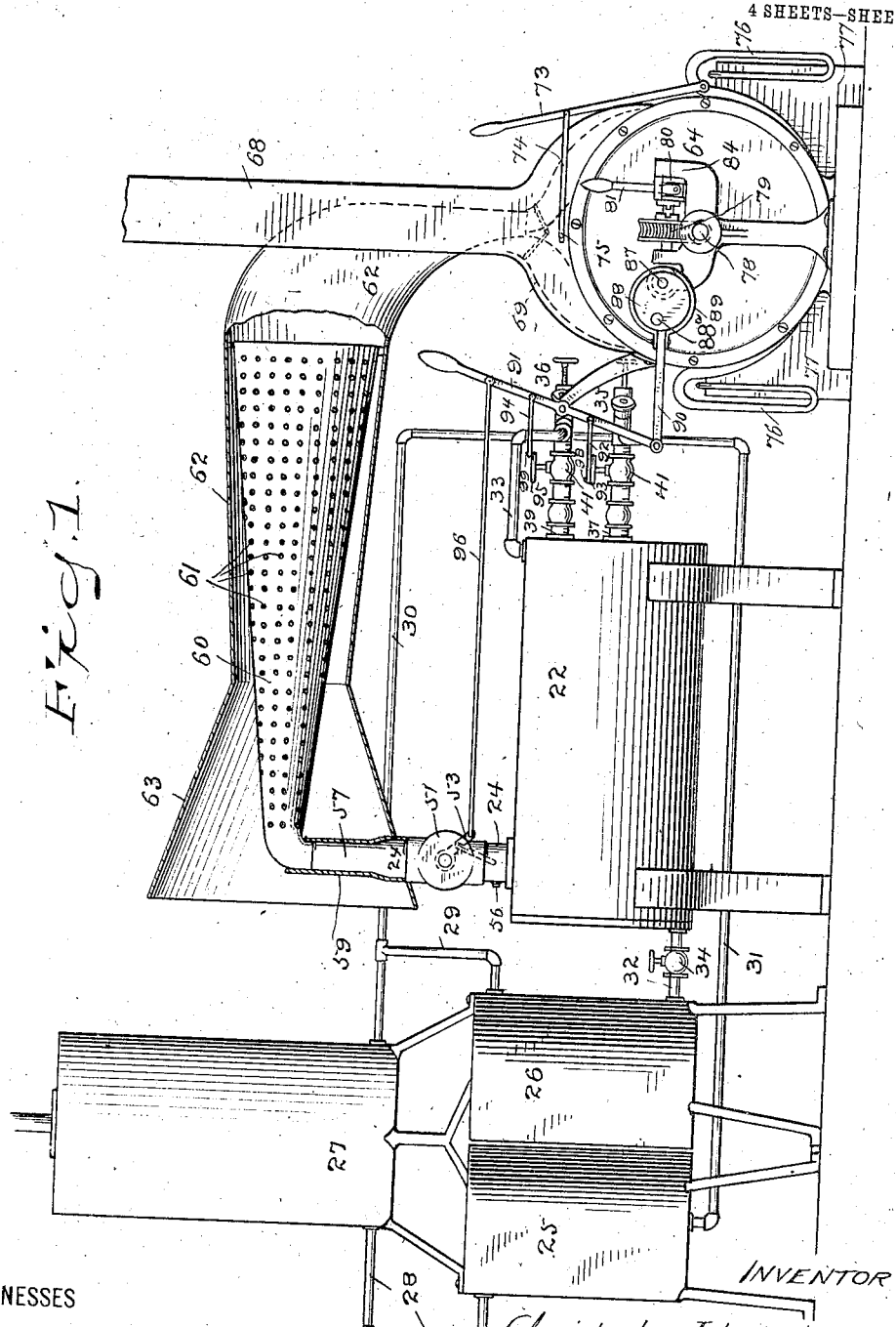

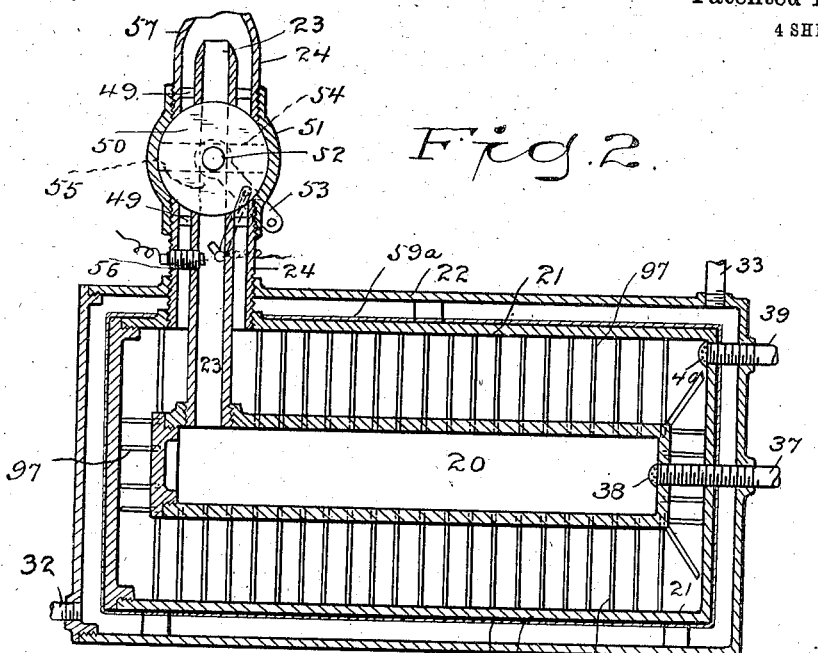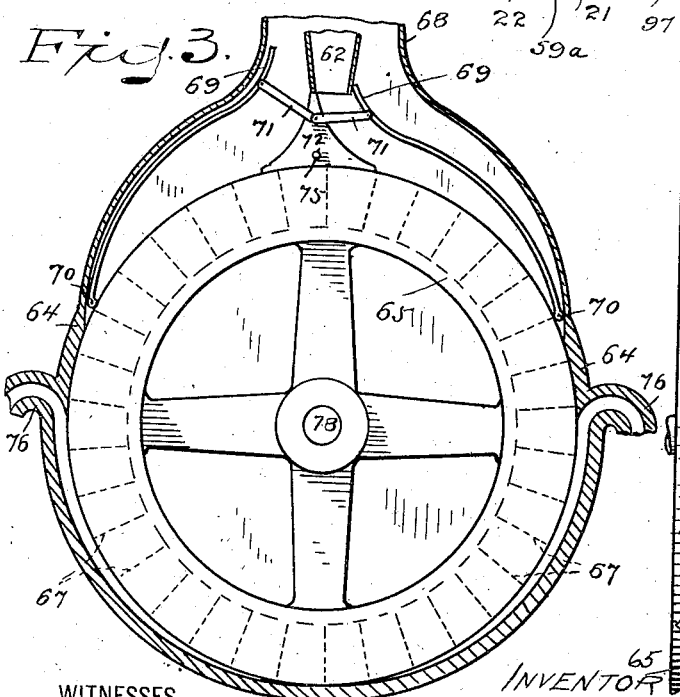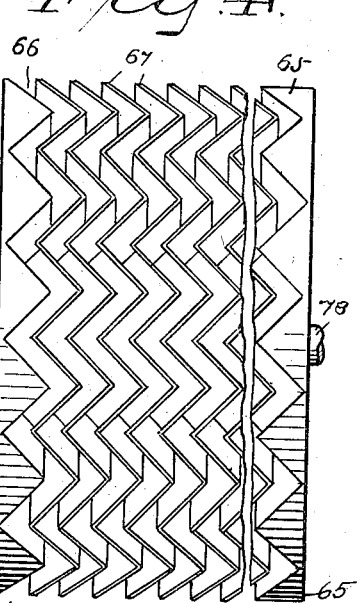

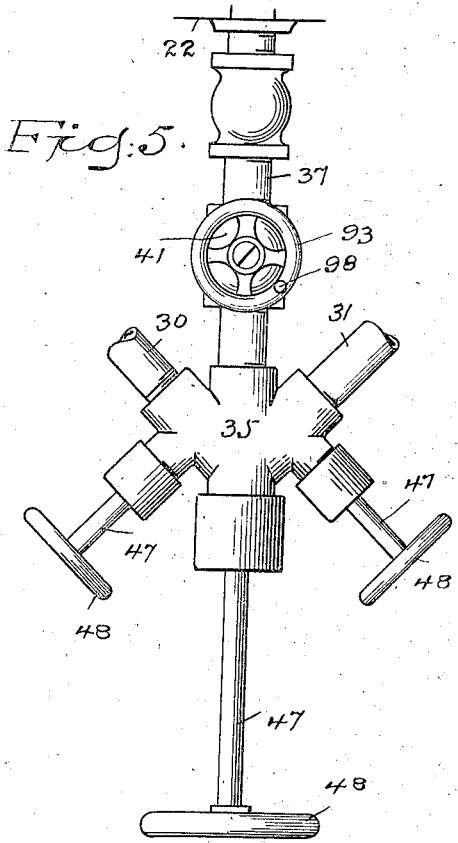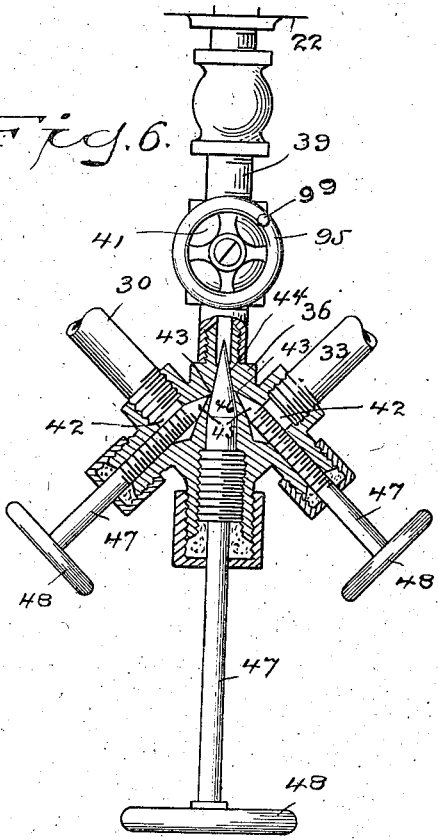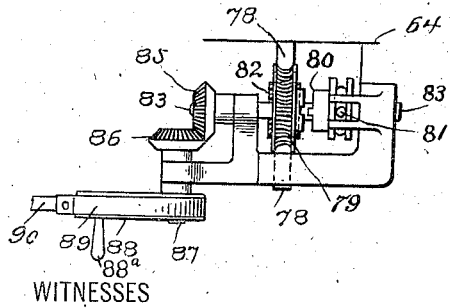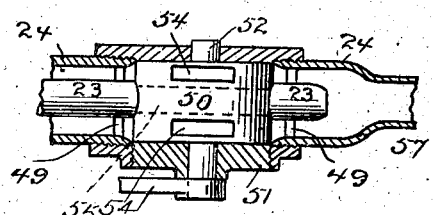

CHRISTOPHER JOHN LAKE (NAME CHANGED FROM JOHN CHRISTOPHER LAKE
BY JUDICIAL ORDER).
POWER GENERATING APPARATUS.
APPLICATION FILED JAN. 4, 1906.

942,873.

Patented Dec. 7, 1909.

4 SHEETS—SHEET 4.

WITNESSES

INVENTOR
Christopher John Lake
formerly John Christopher Lake

BY

ATTORNEY

UNITED STATES PATENT OFFICE.

CHRISTOPHER JOHN LAKE, (NAME CHANGED FROM JOHN CHRISTOPHER LAKE BY JUDICIAL ORDER,) OF BRIDGEPORT, CONNECTICUT.

POWER-GENERATING APPARATUS.

942,873.  Specification of Letters Patent.  Patented Dec. 7, 1909.

Application filed January 4, 1906. Serial No. 294,552.

*To all whom it may concern:*

Be it known that I, CHRISTOPHER JOHN LAKE (formerly JOHN CHRISTOPHER LAKE,) a citizen of the United States, and resident of Bridgeport, in the county of Fairfield and State of Connecticut, have invented certain new and useful Improvements in Power-Generating Apparatus, of which the following is a specification.

This invention has for its object the production of apparatus for developing into available mechanical power practically the entire heat generated from explosions without the great waste of heat and power that is inseparable from the usual types of engines employed for this purpose.

A further object is to provide direct and effective means for transferring heat from explosions to water for the formation of steam, and to employ water for this purpose in such form that it will readily absorb the maximum amount of heat for the smallest amount of water.

A further object is to produce by explosions and the heat thereof a power fluid of large volume and density suitable to be employed for driving engines, and more especially for driving engines of the type known as rotary engines or turbines.

A further object is to provide means for mingling free atmospheric air with the power fluid produced by the explosions and employed in the engine.

A further object is to provide means for applying the heated power fluid impulsively to atmospheric air in such manner as to communicate both its heat and its mechanical velocity thereto and means for expanding the air thus heated and impulsed before conducting it to the turbine.

The invention further consists in certain constructions, and in certain parts improvements and combinations by which the principles above set forth are utilized.

Figure 10:
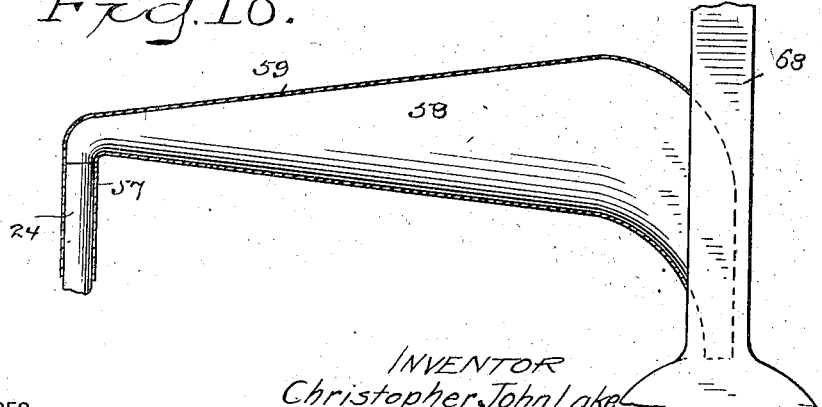

With these and other objects in view, I have devised the novel apparatus which I will now describe, referring to the accompanying drawings forming part of this specification, in which reference characters are used to indicate the several parts:

Figure 1 is an elevation of my complete apparatus, the air funnel and conduit being in section. Fig. 2 a vertical section on an enlarged scale, illustrating the construction of the inner and outer cylinders, the cylinder casing and delivery pipes, the controlling valve and sparker appearing in elevation. Fig. 3 a transverse section of the motor casing on a still larger scale, the rotating member appearing in end elevation. Fig. 4 a side elevation of the motor wheel detached. Fig. 5 a plan view on an enlarged scale of the combined oil and air valve detached. Fig. 6 a similar view partly in horizontal section to show the internal construction of the combined water and air valve, the two valves being similar in construction. Fig. 7 a plan view of the valve-operating mechanism detached. Fig. 8 a detail view partly in section and partly in elevation, illustrating the construction of the valve in the gas and steam pipes. Fig. 9 an end view of the engine complete as seen from the right in Fig. 1, and Fig. 10 is a detail view partly in section and partly in elevation, illustrating a variant form of the invention in which the air funnel is dispensed with, and the alternate volumes or impulses of exploded gas and steam are conducted to the prime mover without the mixture therewith of atmospheric air.

While I have illustrated my apparatus in combination with a rotary engine, it is to be understood that the power fluid is applicable to general purposes either as a driving power for rotating engines or the like motors, or as a blast for any of the like purposes for which an air blast has been or may be employed.

20 indicates the inner cylinder which lies within an outer cylinder indicated by 21, which in turn lies within a cylinder casing indicated by 22. While I have illustrated the cylinder 21 as completely surrounding and inclosing the cylinder 20 it is, of course, to be understood that this is only one of the various ways in which the two chambers may be adjacently or contiguously arranged to effect the necessary transfer of heat between them to carry out the principle of the invention.

24 indicates a pipe leading from the outer cylinder, and 23 a smaller pipe within pipe 24, which leads from the inner cylinder and terminates in pipe 24.

25 indicates an oil tank, 26 a water tank, and 27 an air tank in which the air is at all times maintained under uniform compression by any suitable means, as a pump, forming no portion of the present invention. These tanks may be placed in any convenient position with relation to the cylinders and to each other. In the present instance I have shown the air tank as supported above the oil and water tanks, which, however, is wholly unimportant so far as the principle of the invention is concerned.

28 indicates a pipe leading from the air tank to the oil tank, 29 a pipe leading from the air tank to the water tank, 30 a pipe leading from the air tank, which branches and leads to the combined oil and air valve, and the combined water and air valve, presently to be described, 31 a pipe leading from the oil tank to the combined oil and air valve, 32 a pipe leading from the water tank to the casing, and 33 a pipe leading from the casing to the combined water and air valve.

34 indicates a valve in pipe 32, 35 the combined oil and air valve intermediate pipes 30 and 31 and the inner cylinder, and 36 the combined water and air valve intermediate pipes 30 and 33 and the outer cylinder, it being understood of course that pipe 30 branches, one branch leading to each valve. As the special arrangement of these pipes is wholly immaterial, the air pipes communicating with valves 35 and 36 are both indicated by 30.

37 indicates a pipe leading from the combined oil and air valve to the inner cylinder, the inner end of said pipe being provided with a vaporizer 38 within the cylinder, and 39 indicates a pipe leading from the combined water and air valve to the outer cylinder, the inner end of said pipe being provided with a vaporizer 40 within the cylinder. Pipes 37 and 39 are each provided with ordinary shut off valves 41, which in use are operated by means of connections, presently to be fully described, to alternately admit vaporized oil and air to the inner cylinder and finely divided water and air to the outer cylinder. The structure of valves 35 and 36 is the same and is clearly illustrated in Fig. 6. Pipes 30 and pipes 31 and 33 respectively, lead into chambers 42 in the bodies of the combined oil and air and combined water and air valves.

43 indicates reduced tapering openings leading from chambers 42 into central chambers having tapering openings 44 in the bodies of the combined oil and air and combined water and air valves shown only in Fig. 6. Openings 43 are each controlled by a cone-pointed valve 45, and opening 44 is controlled by a cone-pointed valve 46, each of said valves being provided with shanks 47 and hand wheels 48 for convenience in operation.

An important feature of the invention is that I utilize the heat of the inner cylinder to convert the finely divided water and air in the outer cylinder into steam and heated air.

97 denotes rods extending from the inner cylinder to the outer cylinder which act to support and brace the inner cylinder, and also serve both as conductors and radiators of heat from the inner cylinder to assist in converting the finely divided water and air in the outer cylinder into steam and heated air.

The use in the outer cylinder of finely divided vaporized or atomized water in the form of spray mixed with air possesses the advantage of applying the water in such finely-divided form as to expose a very large surface to the action of the heat from the inner cylinder, thereby insuring its complete and speedy conversion into steam. Not only is the water in the best condition for the absorption of heat, but the air interspersed between its particles forms a mixture the nature of which is such that a great amount of heat cannot be conducted through it and lost by radiation from the outer walls, as occurs when water alone or in liquid form in large masses is employed. The air and water in this respect are complementary in their action, the air serving to prevent the escape of heat and the water being in the best form for absorbing the heat thus conserved.

The rods or projections 97 are convenient for the support of the outer cylinder and may all be extended thereto for that purpose, which, however, is incidental and not their main function; nor are these rods mainly for the purpose of cooling the inner cylinder, since sufficient cooling can be readily accomplished through smooth walls, especially where water is employed. There is difficulty, however, in effecting the nearly instantaneous conversion of the charge in the outer cylinder into a fluid of high pressure, and it is to meet this difficulty that the rods are used. Their special function, therefore, is to distribute the heat-communicating surfaces throughout the entire body of the aerated spray in order that all parts of it may become instantly converted into a mixture of steam and highly heated air.

In order to retain the heat as much as possible within the outer cylinder, I preferably cover the latter with asbestos, or other insulating material, indicated by 59$^a$. The use of the outer cylinder renders a cooling jacket for the inner cylinder wholly unnecessary, as the heat generated by the explosions of gas within the inner cylinder is absorbed to such an extent in the conversion of the finely divided water and air in the outer cylinder into steam and heated air, as to render undue heating of the parts impossible. As it is not practicable to wholly prevent the radiation of heat from the outer cylinder, I utilize the heat radiated from the outer cylinder in heating the water supply, by inclosing the outer cylinder in the casing 22 through which the water supply must pass and in which it is raised to a relatively high temperature before it is admitted to the outer cylinder.

As already stated, pipe 23 leading from the inner cylinder lies within pipe 24 leading from the outer cylinder, pipe 23 being retained in place concentric with pipe 24 by means of braces 49. The passage of exploded gases and steam and heated air from these cylinders is controlled by a disk valve, 50, in a casing 51, which is inserted between parts of pipe 24 and to which both parts of said pipe are rigidly connected. Valve 50 is carried by a shaft 52 journaled in the casing, and provided with an operating arm 53. This valve is provided with two passages 54 through it, which are adapted to register with pipes 24 on opposite sides of pipe 23, and between passages 54 and at right angles thereto with a passage 55, which is adapted to register with pipe 23, the valve being oscillated in use by means of operating arm 53 and connections, as will presently be more fully described, in such a manner as to alternately open and close the pipes; that is to say, when pipe 23 is discharging the products of the explosions of gas from the inner cylinder, pipe 24 will be closed, and when pipe 24 is discharging steam from the outer cylinder, pipe 23 will be closed. Pipe 24 is preferably covered with insulating material 59, as asbestos, to prevent radiation of heat therefrom.

56 denotes a sparker in pipe 23, part of which is connected with and which is operated by arm 53, to explode the gases in pipe 23 and the inner cylinder, as will be more fully explained. Above valve 50 and above the upper end of pipe 23, pipe 24 is contracted as at 57.

In the form illustrated in Fig. 10, pipe 24 leads into an expanding conduit 58 and the alternate volumes of exploded gas and steam mixed with heated air expand therein and are conducted to the motor presently to be described, pipe 24 and the conduit being both shown as covered with insulating material 59, for example asbestos, to prevent radiation of heat therefrom.

In the form illustrated in Fig. 1, pipe 24 leads into an open mouthed expanding discharge tube 60 which is provided with numerous perforations 61 for the admission of air. This discharge tube lies within and opens into an expanding conduit 62 which leads to the driving wheel the same as in the other form. The rear end of conduit 62 is provided with a rearwardly expanding air funnel 63. The action of this air funnel in connection with the perforated discharge tube is to draw in large quantities of atmospheric air, which passes through the perforations in the expanding discharge tube and greatly increases the volume and accelerates the velocity of the alternate volumes of exploded gas and steam mixed with heated air which are conducted by the conduit to the motor. This increase of velocity due to the admission of air results from the relief afforded by the openings 61 against the tendency to the formation of a vacuum within the funnel 60. When the admission of air is not provided for, it is necessary for the power fluid to act against the pressure of one atmosphere over the entire cross-sectional area of the expanded casing. The admission of air at the rear end of the funnel relieves the power fluid of this obstruction by giving vent at the rear so as to balance the atmospheric pressure. The air is led to the perforations 61 through the expanded entrance portion 63 of the outer funnel. The current of air entering this portion and passing through the perforations is impelled forward to the motor by the alternate impulses of fluid from the generating chambers which energizes the air and mingles with the air on its way to the motor. As the upper end of pipe 24, which lies within the air funnel, is covered with insulating material 59, radiation of heat therefrom is prevented. The forward end of the conduit flattens and widens out and opens into the casing 64 of a motor wheel 65, which may be of any ordinary or preferred construction. I preferably, however, use a motor whose operative peripheral surface consists of a series of zigzag channels or troughs 66 separated from each other by zigzag partitions or walls, 67, against which the alternate volumes or impulses of exploded gas combined with atmospheric air in motion, and steam combined with atmospheric air in motion, impinge, and are deflected in opposite directions to impart rotary motion, the exhaust from the motor leading into an exhaust pipe or stack 68 which leads from casing 64, and into which conduit 62 passes, as clearly shown in Figs. 1 and 3.

Within the upper part of the casing are two valves or gates 69 hinged to the casing as at 70, and the upper ends of which are adapted to engage the lower end of the conduit. A rod 71 connects each of the gates with a block 72, which is adapted to reciprocate over the surface of the motor wheel and to just pass under the lower end of the conduit, the upper end of the block registering with the lower end of the conduit to form a passage for the alternating volumes of exploded gas and air and steam and air. The block and the gates are correspondingly curved and the gates are maintained by the rods at a distance from the block corresponding with the thickness of the flattened lower end of the conduit. The block and gates are controlled to reverse the movement of the motor by means of a reversing lever 73 pivoted to any fixed portion of the mechanism, and a connecting rod 74 pivoted to the lever and to a pin 75, which projects from the block and passes through a slot in the end wall of the casing.

The operation of reversing the wheel will be readily understood from Figs. 1 and 3. When the block is at the extreme of its movement toward the left, and the right gate is in alinement with the lower end of the conduit, the alternate driving impulses, currents or volumes of gas and air and steam and air will be conducted toward the right, and will engage the right side of the motor wheel causing it to rotate from left to right. When the block is moved to the extreme of its movement toward the right, the left gate, which has previously been in the open position, will be moved to the closed position, that is, into alinement with the lower end of the conduit, and the right gate will be moved to the open position. The alternate driving impulses or volumes of gas and air and steam and air will now pass toward the left and the wheel will rotate from right to left. After passing the wheel the exhaust, consisting of mingled gases and air, passes out through exhaust pipe or stack 68. Some of the steam however is condensed in the casing and the water of condensation passes therefrom through pipes 76, and may be conducted away, but is preferably conducted to a tank 77 and retained to be used over again. Pipes 76 are shown as curved to form traps or siphons, which remain filled with the water of condensation, so that there can be no escape of gases through said pipes. These pipes are shown as leading from the casing at about its mid height, and the casing is shown as conforming to the curvature of the wheel and fitting it closely about the pipes and also at the bottom, so that when the wheel is rotating from left to right, the water of condensation will be expelled from the casing through the left pipe 76, and when the wheel is rotating from right to left, the water of condensation will be expelled from the casing through the right pipe 76.

The valve operating mechanism is clearly illustrated in Fig. 1, which see in connection with Fig. 7. 78 denotes the shaft of the wheel, and 82 a worm. A clutch 80 operated by a clutch lever 81 is mounted on the shaft 83. 79 denotes a worm gear engaging the worm and mounted loosely on shaft 83 supported in bracket 84. Shaft 83 carries a bevel pinion 85, which meshes with a bevel pinion 86 on a shaft 87, which also carries an eccentric 88. 89 denotes a strap encircling the eccentric, and 90 a rod connecting the eccentric strap with an operating lever 91. 92 denotes a rod pivoted to said operating lever and to a pin 98 projecting from the wheel 93 of the valve 41 in the pipe 37 leading from combined oil and air valve 35 to the inner cylinder. 94 denotes a rod pivoted to said lever and to a pin 99 projecting from the operating wheel 95 of the valve 41 in the pipe 39 leading from combined water and air valve 36 to the outer cylinder, and 96 denotes a rod pivoted to said lever and to the operating arm 53 of disk valve 50 in pipes 23 and 24, and which also operates the sparker. The several valves, and in connection therewith the sparker, are so timed as to cause alternate volumes of exploded gas and steam and air to pass to the wheel.

The operation is as follows: When the engine is not in use the combined oil and air valve 35, and the combined water and air valve 36, are closed by means of the cone-pointed valves 46. The first thing to do is to open these valves. The closing of these valves stops the engine. Under ordinary circumstances in stopping and starting the engine, valves 45 which independently control the passage of oil and air and of water and air, to valves 35 and 36 respectively, need not be operated. It is contemplated that these valves when once set will not require change under the ordinary conditions of use, although either of these valves may be operated at any time independently of the others to regulate the flow of oil, water and air to the combined oil and air and combined water and air valves, 35 and 36 respectively. In starting the operator turns the eccentric by the handle 88ª and swings operating lever 91 backward and forward a few times by hand which operates the valves controlling the supply of vaporized oil and air to the inner cylinder, and of finely divided water and air to the outer cylinder, and also the disk valve in the pipes leading from the cylinders, and the sparker, the motor being of course disconnected from the valve mechanism by means of the clutch lever and clutch. When the valve 41 controlled by connecting rod 92 is open, oil and air pass to the inner cylinder through pipe 37 and vaporizer 38, and passage 55 in disk valve 50 is in alinement with pipe 23. The vaporized oil and air in pipe 23 and the inner cylinder is now ignited by the sparker, and the products of the explosion pass through pipe 23 and the conduit or discharge tube, as may be, to casing 65, where they act upon the motor.

In the form illustrated in Fig. 1, where the discharge tube and air funnel are used, the volume of the current of exploded gas is increased and its velocity is accelerated by the admission of atmospheric air. An instant later the valve 41 controlled by connecting rod 94 is opened, the valve 41 controlled by connecting rod 92 is closed, and disk valve 50 is oscillated to close the passage 55 in pipe 23 and open the passages 54 in pipe 24. As soon as the parts are in this position finely divided water and air, the water having already been highly heated within the cylinder casing by heat radiated from the outer cylinder, will pass to the outer cylinder through pipe 39 and vaporizer 40, and by means of heat radiated from the inner cylinder will be converted into steam in the outer cylinder, and will pass through pipe 24 and the conduit or discharge tube, as may be, to casing 65, where it will in turn act upon the wheel.

It will be observed that the water and air valve that I use and which is illustrated in Figs. 5 and 6, is so constructed that either the water or the air may be completely cut off so that the outer cylinder may be supplied with water alone or air alone or by any desired mixture of both. It is my intention to use only so much water with the air as may be absolutely necessary to prevent overheating of the inner cylinder and in some embodiments of my invention I desire to dispense with the water entirely and use an increased quantity of air in the outer cylinder. With this arrangement, all the heat imparted to the contents of the outer cylinder will be available for power purposes and none lost in the latent heat of evaporated water. For some purposes, however, where it is desirable to employ a power fluid of the maximum density or specific gravity a larger amount of water is employed and its vapor mingled with the heated gases of the explosions. This produces a power fluid of greater weight and capable of more energetic effect, especially in motors of low velocity.

In the form illustrated in Fig. 1 where the discharge tube and air funnel are used, the volume of the current of steam is increased and its velocity accelerated by the admission of atmospheric air. After a limited number of movements of the valve mechanism by the operator, the alternate volumes or impulses of exploded gas and steam will pass to casing 65 and act on the motor with perfect regularity and smoothness. The operator then by means of the clutch lever connects the valve mechanism with the wheel and the operation becomes automatic, the direction of rotation of the wheel being determined by movement of reversing lever 73, which controls the valves or gates in the wheel casing.

Having thus described my invention I claim:

1. The combination with a generator for producing heated gas by explosions of a heat-absorbing chamber contiguous to the generator, a port in said chamber for admitting a heat-absorbing agent thereto to be converted into pressure fluid by the heat of the explosions, a common discharge tube from the generator and the chamber, and an alternately-acting valve device common to the generator and chamber for releasing alternately the gas from the generator and the pressure fluid from the chamber.

2. The combination with a generator for producing heated gas by explosions, of a heat-absorbing chamber surrounding the generator, a port in said chamber for admitting a heat-absorbing agent thereto to be converted into pressure fluid by the heat of the explosions, a common discharge tube from the generator and the chamber, and an alternately-acting valve device common to the generator and chamber for releasing alternately the gas from the generator and the pressure fluid from the chamber.

3. The combination with a generator for producing heated gas by explosions, of a heat-absorbing chamber contiguous to the generator, a port in said chamber for admitting a heat-absorbing agent thereto to be converted into pressure fluid by the heat of the explosions, a common discharge tube from the generator and the chamber, an alternately-acting valve device common to the generator and chamber for releasing alternately the gas from the generator and the pressure fluid from the chamber, and a motor connected to operate said valve device.

4. The combination with a generator for producing heated gas by explosions, of a heat-absorbing chamber contiguous to the generator, a mixing device connected with the chamber for producing a mixture of air and finely-divided water, means for introducing said mixture into the chamber to be heated therein by the heat of the explosions, and a common discharge tube from the generator and the chamber.

5. The combination with a generator for producing heated gas by explosions, of a heat-absorbing chamber surrounding the generator, a mixing device connected with the chamber for producing a mixture of air and finely-divided water, means for introducing said mixture into the chamber to be heated therein by the heat of the explosions, and a common discharge tube from the generator and the chamber.

6. The combination with a generator for producing heated gas by explosions of a heat-absorbing chamber contiguous to the generator, a mixing device connected with the chamber for producing a mixture of air and finely divided water, means for introducing said mixture into the chamber to be heated therein by the heat of the explosions, a common discharge tube from the generator and the chamber, and an alternately-acting valve device common to the generator and chamber for releasing alternately the gas from the generator and the heated mixture from the chamber.

7. The combination with a generator for producing heated gas by explosions, of a heat-absorbing chamber surrounding the generator, a mixing device connected with the chamber for producing a mixture of air and finely-divided water, means for introducing said mixture into the chamber to be heated therein by the heat of the explosions, a common discharge tube from the generator and the chamber, and an alternately-acting valve device common to the generator and chamber for releasing alternately the gas from the generator and the heated mixture from the chamber.

8. The combination with a generator for producing heated gas by explosions, of a heat-absorbing chamber contiguous to the generator, a mixing device connected with the chamber for producing a mixture of air and finely-divided water, means for introducing said mixture into the chamber to be heated therein by the heat of the explosions, a common discharge tube from the generator and the chamber, an alternately-acting valve device common to the generator and chamber for releasing alternately the gas from the generator and the heated mixture from the chamber, and a motor connected to operate said valve device.

9. The combination with a generator for producing heated gas by explosions, of heat distributing projections on the walls of the generator, a heat-absorbing chamber contiguous to the generator and inclosing said projections, means for producing a mixture of air and finely-divided water as a heat-absorbing agent, a port in said heat-absorbing chamber for admitting said mixture of air and water thereto to be converted into pressure fluid by the heat of the explosions, and a common discharge tube from the generator and the chamber.

10. The combination with a generator for producing heated gas by explosions, of heat distributing projections on the walls of the generator, a heat-absorbing chamber surrounding the generator and inclosing said projections, means for producing a mixture of air and finely-divided water as a heat-absorbing agent, a port in said heat-absorbing chamber for admitting said mixture of air and water thereto to be converted into pressure fluid by the heat of the explosions, and a common discharge tube from the generator and the chamber.

11. The combination with a generator for producing heated gas by explosions, of heat distributing projections on the walls of the generator, a heat-absorbing chamber contiguous to the generator and inclosing said projections, a port in said chamber for admitting a heat-absorbing agent thereto to be converted into pressure fluid by the heat of the explosions, a common discharge tube from the generator and the chamber, and an alternately-acting valve device common to the generator and chamber for releasing alternately the gas from the generator and the pressure fluid from the chamber.

12. The combination with a generator for producing heated gas by explosions, of heat distributing projections on the walls of the generator, a heat-absorbing chamber surrounding the generator and inclosing said projections, a port in said chamber for admitting a heat-absorbing agent thereto to be converted into pressure fluid by the heat of the explosions, a common discharge tube from the generator and the chamber, and an alternately acting valve device common to the generator and chamber for releasing alternately the gas from the generator and the pressure fluid from the chamber.

13. The combination with a generator for producing heated gas by explosions, of heat distributing projections on the walls of the generator, a heat-absorbing chamber contiguous to the generator and inclosing said projections, a port in said chamber for admitting a heat-absorbing agent thereto to be converted into pressure fluid by the heat of the projections, a common discharge tube from the generator and the chamber, an alternately-acting valve-device common to the generator and chamber for releasing alternately the gas from the generator and the pressure fluid from the chamber, and a motor connected to operate said valve device.

14. The combination with a generator for producing heated gas by explosions, of heat distributing projections on the walls of the generator, a heat-absorbing chamber contiguous to the generator and inclosing said projections, a mixing device connected with the chamber for producing a mixture of air and finely-divided water, means for introducing said mixture into the chamber to be heated therein by the heat of the explosions, and a common discharge tube from the generator and the chamber.

15. The combination with a generator for producing heated gas by explosions, of heat distributing projections on the walls of the generator, a heat-absorbing chamber contiguous to the generator and inclosing said projections, a mixing device connected with the chamber for producing a mixture of air and finely-divided water, means for introducing said mixture into the chamber to be heated therein by the heat of the explosions, a common discharge tube from the generator and the chamber, and an alternately-acting valve device common to the generator and chamber for releasing alternately the gas from the generator and the heated mixture from the chamber.

16. The combination with a generator for producing heated gas by explosions, of heat distributing projections on the walls of the generator, a heat-absorbing chamber contiguous to the generator and inclosing said projections, a mixing device connected with the chamber for producing a mixture of air and finely-divided water, means for introducing said mixture into the chamber to be heated therein by the heat of the explosions, a common discharge tube from the generator and the chamber, an alternately-acting valve device common to the generator and chamber for releasing alternately the gas from the generator and the heated mixture from the chamber, and a motor connected to operate said valve device.

17. The combination with a generator for producing heated gas by explosions, of heat distributing projections on the walls of the generator, a heat-absorbing chamber contiguous to the generator and inclosing said projections, a mixing device connected with the chamber for producing a mixture of air and finely-divided water, means for introducing said mixture into the chamber to be heated therein by the heat of the explosions and an alternately-acting valve device common to the generator and the chamber for releasing alternately the gas from the generator and the heated mixture from the chamber.

18. The combination with a generator for producing heated gas by explosions, of heat distributing projections on the walls of the generator, a heat-absorbing chamber contiguous to the generator and inclosing said projections, a mixing device connected with the chamber for producing a mixture of air and finely-divided water, and means for introducing said mixture into the chamber to be heated therein by the heat of the explosions, said mixing device comprising an air delivery pipe, a water delivery pipe intersecting therewith and an adjustable valve at the intersection of said pipes.

19. The combination with a generator for producing heated gas by explosions, of heat distributing projections on the walls of the generator, a heat-absorbing chamber contiguous to the generator and inclosing said projections, a mixing device connected with the chamber for producing a mixture of air and finely-divided water, means for introducing said mixture into the chamber to be heated therein by the heat of the explosions, and a common discharge tube from the generator and the chamber, said mixing device comprising an air delivery pipe, a water delivery pipe intersecting therewith and an adjustable valve at the intersection of said pipes.

20. The combination with a generator for producing heated gas by explosions, of heat distributing projections on the walls of the generator, a heat-absorbing chamber contiguous to the generator and inclosing said projections, a mixing device connected with the chamber for producing a mixture of air and finely-divided water, means for introducing said mixture into the chamber to be heated therein by the heat of the explosions, and an alternately-acting valve device common to the generator and chamber for releasing alternately the gas from the generator and the heated mixture from the chamber, said mixing device comprising an air delivery pipe, a water delivery pipe intersecting therewith and an adjustable valve at the intersection of said pipes.

21. The combination with the generator for producing heated gas by explosions, of a heat-absorbing chamber contiguous to the generator, a mixing device connected with the chamber for producing a mixture of air and finely-divided water, means for introducing said mixture into the chamber to be heated therein by the heat of the explosions, an alternately-acting valve device common to the generator and chamber for releasing alternately the gas from the generator and the heated mixture from the chamber, and a motor connected to operate said valve device.

22. The combination with a generator for producing heated gas by explosions, of heat distributing projections on the walls of the generator, a heat-absorbing chamber contiguous to the generator and inclosing said projections, a port in said chamber for admitting a heat-absorbing agent thereto to be converted into pressure fluid by the heat of the explosions, and an alternately-acting valve device common to the generator and chamber for releasing alternately the gas from the generator and the pressure fluid from the chamber.

23. The combination with a generator for producing heated gas by explosions, of a heat-absorbing chamber contiguous to the generator, a port in said chamber for admitting a heat-absorbing agent thereto to be converted into pressure fluid by the heat of the explosions, and an alternately-acting valve device common to the generator and chamber for releasing alternately the gas from the generator and the pressure fluid from the chamber.

24. The combination with a generator for producing heated gas by explosions, of a heat-absorbing chamber contiguous to the generator, a port in said chamber for admitting a heat-absorbing agent thereto to be converted into pressure fluid by the heat of the explosions, an alternately-acting valve device common to the generator and chamber for releasing alternately the gas from the generator and the pressure fluid from the chamber and a motor connected to operate said valve device.

25. The combination with a generator for producing heated gas by explosions, of heat-distributing projections on the walls of the generator, a heat-absorbing chamber contiguous to the generator and inclosing said projections, a port in said chamber for admitting a heat-absorbing agent thereto to be converted into pressure fluid by the heat of the explosions, an alternately-acting valve device common to the generator and chamber for releasing alternately the gas from the generator and the pressure fluid from the chamber and a motor connected to operate said valve device.

26. The combination with the discharge tube of a generator for power fluid, of means for applying the fluid therefrom impulsively to atmospheric air to mingle therewith and produce a current thereof, said means being adapted to expand the current thus produced and comprising a perforated, expanding extension of the discharge tube and a conduit surrounding said extension, the conduit having an enlarged open entrance end with walls converging to a constricted central portion thence diverging to its exit end, the air being collected in the enlarged open entrance end.

In testimony whereof I affix my signature, in presence of two witnesses.

CHRISTOPHER JOHN LAKE,
Formerly JOHN CHRISTOPHER LAKE.

Witnesses:
A. M. WOOSTER,
S. W. ATHERTON.